(12) United States Patent
Rahul et al.

(10) Patent No.: US 11,429,444 B1
(45) Date of Patent: Aug. 30, 2022

(54) MANAGING DISTRIBUTION OF I/O QUEUE PAIRS OF A TARGET AMONG HOSTS

(71) Applicant: HEWLETT PACKARD ENTERPRISE DEVELOPMENT LP, Houston, TX (US)

(72) Inventors: Kumar Rahul, Andover, MA (US); Krishna Babu Puttagunta, Roseville, CA (US); Alice Terumi Clark, Andover, MA (US); Barry A. Maskas, Andover, MA (US); Rupin Tashi Mohan, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/243,945

(22) Filed: Apr. 29, 2021

(51) Int. Cl.
  *G06F 13/16*   (2006.01)
  *G06F 9/50*    (2006.01)
(52) U.S. Cl.
  CPC ........ *G06F 9/5011* (2013.01); *G06F 13/1668* (2013.01)
(58) Field of Classification Search
  None
  See application file for complete search history.

(56) References Cited

U.S. PATENT DOCUMENTS 9,323,544 B2* 4/2016 Manchineni .......... G06F 9/4411
9,785,356 B2* 10/2017 Huang .................... G06F 13/00
10,019,181 B2* 7/2018 Singh .................... G06F 3/0656
11,099,754 B1* 8/2021 Mallick ................. G06F 3/0635
2006/0112301 A1 5/2006 Wong
2020/0310657 A1 10/2020 Cayton et al.
2021/0240611 A1* 8/2021 Tumanova ............ G06F 3/0647
2021/0342078 A1* 11/2021 Krasner ................. G06F 3/065

OTHER PUBLICATIONS

Github, "Number of NVMe IO Queues Per Subsystem," May 15, 2017, 6 pages.
NVM Express, Inc., "NVMe over Fabrics Overview," available online Jan. 17, 2021, <https://web.archive.org/web/20210117031030/https://nvmexpress.org/wp-content/uploads/NVMe_Over_Fabrics.pdf>.
Wikipedia, "Non-volatile memory," Jan. 8, 2021, <https://en.wikipedia.org/w/index.php?title=Non-volatile_memory&oldid=999110604>.

* cited by examiner

*Primary Examiner* — Michael Sun
(74) *Attorney, Agent, or Firm* — Hewlett Packard Enterprise Patent Department

(57) ABSTRACT

Examples relate to managing distribution of a total number of I/O queue pairs of an NVMe target among a plurality of NVM subsystems of the NVMe target and a plurality of hosts connected to the NVMe target. A target controller of the NVMe target defines a number of I/O queue pairs for a dedicated pool and a number of I/O queue pairs for a reserved pool based on the total number of I/O queue pairs. The target controller distributes a number of I/O queue pairs to each of the hosts from the number of I/O queue pairs of the dedicated pool and utilizes the number of I/O queue pairs of the reserved pool to balance out the number of I/O queue pairs on each of the hosts by selectively changing the number of I/O queue pairs of the reserved pool.

20 Claims, 6 Drawing Sheets

US 11,429,444 B1

MANAGING DISTRIBUTION OF I/O QUEUE PAIRS OF A TARGET AMONG HOSTS

BACKGROUND

Non-volatile memory (NVM) is a type of computer memory that retains its contents across power cycles and is therefore capable of being used as storage. Compared to volatile memory that needs power to retain data, the NVM may continue to store data even after computer power is turned off.

BRIEF DESCRIPTION OF THE DRAWINGS

The following detailed description references the drawings, wherein.

DETAILED DESCRIPTION

Figure 1:
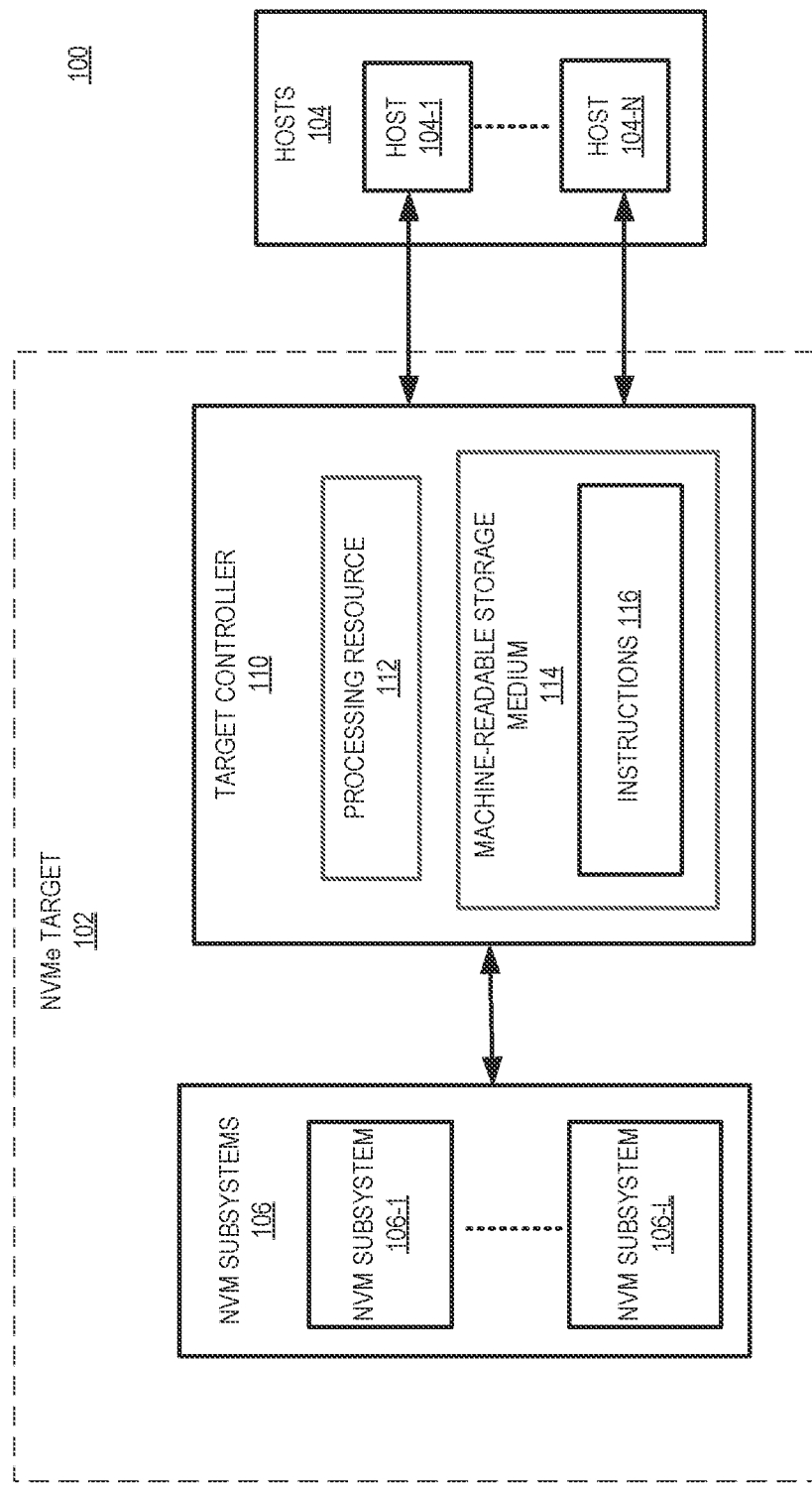
FIG. 1 is a block diagram of a system including an NVMe target and a plurality of hosts connected to the NVMe target, in accordance with an example.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as coupled or associated, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. The term "based on" means based at least in part on. It will also be understood that, although the terms first, second, third, etc. may be used herein to describe various elements, these elements should not be limited by these terms, as these terms are only used to distinguish one element from another unless stated otherwise or the context indicates otherwise.

Non-volatile memory (NVM) express (NVMe) relates to techniques by which a host may communicate with a storage device (e.g., a solid state drive (SSD)) across a peripheral component interconnect express (PCIe) bus. Using NVMe, the storage device may handle multitude of I/O operations in parallel. In order to provide this benefit to enterprise class data centers, NVMe may be extended over fabrics for increased scalability and shareability. In this regard, NVMe over fabrics (NVMe-oF) relates to a flexible transport abstraction layer for a wide range of storage networking fabrics such as Ethernet and Fibre Channel. A data storage system using NVMe or NVMe-oF may have an Ethernet switch that connects to multiple storage devices within a chassis (referred to as "an NVMe chassis" or "an NVMe target"). The data storage system may include an additional NVMe target without an Ethernet switch (referred to as Ethernet switchless chassis), which may be connected to the Ethernet switch of the NVMe target with Ethernet switch. Such an NVMe target without an Ethernet switch is referred to as just a bunch of flash (JBOF) chassis or target. In some examples, a JBOF target may have an Ethernet repeater or re-timer instead of an Ethernet switch to reduce the cost of a data storage system. Another example of the NVMe target may be a bridge target that interconnects Ethernet to an interface such as PCIe.

A storage device that utilizes NVMe and can process commands (e.g., read commands, write commands, administrative commands, etc.) consistent with and/or provided according to the NVMe specification is referred to as an "NVM subsystem". Example of the "NVM subsystem" may include solid state drives (SSDs) compatible with the NVMe. A host may be a computing device that may access data stored in, and write data to, one or more NVM subsystems. In an example, the host may be a server providing data services to client device(s) based on the data stored in the NVM subsystem(s).

The NVMe specification defines both an interface (e.g., a register-level interface) and a command protocol used to communicate with the NVM subsystems. In a system utilizing NVMe, one or more NVM subsystems (e.g., including port(s) of the NVM subsystem(s)) of an NVMe target may be configured to communicate with one or more hosts (e.g., by including port(s) of the host(s)). The host(s) can communicate with the NVMe target, in particular, the NVM subsystem(s) of the NVMe target based on a mapping that defines which host(s) can access which NVM subsystem(s) of the NVMe target. In some examples, one of the hosts may be mapped to one or more NVM subsystems and one of the NVM subsystems may be mapped to one or more hosts. Communication between the host and the NVM subsystem(s) may be implemented by a target controller. In the examples described herein, the target controller is a storage array controller or an I/O module at a front end that can manage one or more NVM subsystems such as SSDs at a back end. Each host may be connected to a host port on the target controller, thereby associating the host port with the host. In an example, the host port may be a physical port acting as an interface between the host and the target controller.

The interface between a host and an NVM subsystem of an NVMe target may be based on several queue pairs (i.e., paired submission and completion queues shared between the host (e.g., including port(s) of the host(s)) and the NVM subsystem (e.g., including port(s) of the NVM subsystem(s)). The queue pairs may be located either in a host memory (e.g., storage space in the host) or in a memory provided by the NVM subsystem. In an example, the NVMe specification allows up to 64K individual queue pairs, and each queue pair can have as many as 64K entries. Once the queue pairs are configured, these queue pairs may be used for communication between the host and the NVM subsystem using the command protocol. Every new entry may be submitted to the NVM subsystem using a submission command via the submission queue. When the submission command is processed, an entry (that has been previously associated with the submission queue from which the command was retrieved) may be put on the completion queue using a completion command, and an interrupt may be generated. There may be separate queue pairs for administration operations (e.g., creating and deleting queue or updating firmware on the NVM subsystem) and for I/O operations (e.g., Read and Write). Separate queue pairs for I/O operations may avoid any delay in the I/O operations due to long-running administration operations.

Generally, there is a total number of I/O queue pairs that an NVMe target can support (e.g., ranging between 128 and 512 I/O queue pairs), which depends on the NVMe target's hardware resources and implementation. The total number of I/O queue pairs supported may be shared among a number of hosts that are mapped to the NVMe target. Each host may be assigned an upper limit on the number of I/O queue pairs that may be allocated (or granted) for the host to use among the total number of I/O queue pairs supported. The limit on the number of I/O queue pairs that may be allocated or used by a given host (which may be referred to herein as an I/O queue pair limit for the given host) may be an upper limit on the number of I/O queue pairs that may be granted to the given host for use (e.g., when requested by the given host). Further, when the given host requests (e.g., by sending connect commands) a number of I/O queue pairs to be used, the given host may be granted a number of I/O queue pairs up to its assigned limit of I/O queue pairs. The number of I/O queue pairs granted to the given host may be used by the given host for performing one or more I/O operations. In an example, if four hosts are mapped to access an NVMe target that can support 128 I/O queue pairs, each host may be assigned a limit of 32 I/O queue pairs. In such instances, each host may be granted a maximum of 32 I/O queue pairs.

Furthermore, when the given host requests a certain number of I/O queue pairs equal to or more than its assigned limit of I/O queue pairs, a number of I/O queue pairs equal to its assigned limit of I/O queue pairs may be granted to the given host to be used with a first NVM subsystem of the NVMe target mapped to the given host. Generally, if a new host is mapped to the first NVM subsystem, no I/O queue pair may be granted to the new host to be used with the first NVM subsystem. Furthermore, if the given host is mapped to more than one NVM subsystems, none or a few I/O queue pairs may be granted to the given host to be used with a second NVM subsystem. This disproportionate distribution of the I/O queue pairs may create unbalanced load distribution among the hosts and the NVM subsystems of the NVMe target which may cause network congestion and impact overall performance of the system.

Examples described herein provide techniques to manage distribution of a total number of I/O queue pairs of an NVMe target among a plurality of NVM subsystems of the NVMe target and hosts mapped to the NVMe target to attain load distribution among the hosts and the NVM subsystems in a balanced manner. In particular, the examples may provide techniques for assigning a limit on the number of I/O queue pairs allowed to be used by each of the hosts with each of the NVM subsystems of the NVMe target that is mapped to the host at a point in time.

In some examples, a target controller of an NVMe target may define a number of I/O queue pairs for a dedicated pool and a number of I/O queue pairs for a reserved pool based on the total number of I/O queue pairs of the NVMe target. The target controller may determine a limit on the number of I/O queue pairs allowed to be used by each of a plurality of NVM subsystems of the NVMe target (which may be referred to herein as an I/O queue pair limit for an NVM subsystem) based on the number of I/O queue pairs defined for the dedicated pool and a total number of NVM subsystems in the plurality of NVM subsystems of the NVMe target. At a first point in time, the target controller may determine a number of hosts mapped to a given one of the NVM subsystems and determine a first value of I/O queue pairs per host for the given NVM subsystem based on the I/O queue pair limit for the given NVM subsystem and the number of hosts mapped to the given NVM subsystem. The target controller may determine a nearest whole number to the first value if the first value is not a whole number. The target controller may then establish the nearest whole number as a second value of I/O queue pairs per host for the given NVM subsystem. In these instances, the target controller may selectively change the number of I/O queue pairs for the reserved pool by an amount that is based on the second value. The target controller may assign a limit on the number of I/O queue pairs allowed to be used by each host (which may be referred to herein as an I/O queue pair limit for a host) mapped to the given NVM subsystem, that limit is equal to the second value. In some examples, the target controller may determine whether to update the number of I/O queue pairs of the reserved pool based on determining a second number of hosts mapped to the given NVM subsystem at a second point in time.

Examples are further described herein with reference to FIGS. 1-4. It should be noted that the description and figures merely illustrate the principles of the present subject matter along with examples described herein, and should not be construed as limiting the present subject matter. Although some examples may be described herein with reference to a single NVM subsystem of an NVMe target, examples may be utilized for several NVM subsystems in one or more NVMe targets. Furthermore, any functionality described herein as performed by a component (e.g., a target controller) of a system may be performed by at least one processing resource of the component executing instructions (stored on a machine-readable storage medium) to perform the functionalities described herein. Various implementations of the present subject matter have been described below by referring to several examples.

FIG. 1 illustrates an example system 100 in a network using the NVMe-oF specification. The system 100 may include an NVMe target 102 (hereinafter referred to as "target 102") and a plurality of hosts 104-1, 104-2, . . . 104-N (hereinafter collectively referred to as "hosts 104") to communicate to the target 102. The target 102 may include a plurality of NVM subsystems 106-1, 106-2, . . . 106-L (hereinafter collectively referred to as "NVM subsystems 106" or simply "subsystems 106") and a target controller 110. In an example, the target 102 may include an NVMe target with Ethernet switch, a JBOF target (i.e., an NVMe target without Ethernet switch), or a bridge target. In an example, the target 102 may include the subsystems 106 in a storage array and may include the target controller 110 as a controller of the storage array. In other examples, the target 102 may include several storage arrays and a target controller for each of the storage arrays.

The target controller 110 may facilitate connection between the hosts 104 and the subsystems 106 in accordance with a mapping of the hosts 104 with the subsystems 106. The mapping may indicate which hosts 104 can access which subsystem(s) 106 of the target 102 to communicate with the subsystem(s) 106. Each of the subsystems 106 may be accessed by a corresponding subset of the hosts 104. For example, a first subset of the hosts 104 may be mapped to a subsystem 106-1, a second subset of the hosts 104 may be mapped to another subsystem 106-2, and so on. In some examples, a given host of the hosts 104 may be mapped to two or more of subsystems 106 (i.e., the given host may belong to two or more subsets of the hosts 104).

The target controller 110 may be a computing device, or instead be a service or application executing on one or more computing devices. In an example, the target controller 110 may be located in a switch (e.g., embedded in a container), in an external virtual machine (VM), or in a NVM subsystem (e.g., the subsystem 106-1). As used herein, a "computing device" may be a server, a cluster of servers, a storage array, a computer appliance, a workstation, a desktop computer, a laptop computer, a switch, a router, or any other processing device or equipment including a processing resource. In certain examples, the target controller 110 may be an I/O module of the target 102. In an example, the target controller 110 may be attached to, be part of, be associated with, and/or be otherwise related to the target 102. The target controller 110 may include a processing resource 112 communicatively coupled to a machine-readable storage medium 114 including instructions 116 that, when executed by the processing resource 112, cause the target controller 110 to undertake certain actions and functionalities as described herein.

In examples described herein, the processing resource 112 may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) other hardware devices such as but not limited to integrated circuit (IC), control logic, electronic circuits, or combinations thereof that include a number of electronic components. In examples described herein, the processing resource 112 may fetch, decode, and execute the instructions 116 stored in the machine-readable storage medium 114 to perform the functionalities described in relation to the instructions 116 stored on the machine-readable storage medium 114. The machine-readable storage medium 114 may be located either in the computing device executing the instructions 116, or remote from but accessible to the computing device (e.g., via a computer network) for execution. In the examples illustrated herein the target controller 110 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory.

The target controller 110 may include a plurality of host ports (not shown in FIG. 1). Each of the hosts 104 may connect with one of the host ports. Therefore, each of the host ports may be associated with a particular host 104. A given host 104 associated with one of the host ports may be enabled to communicate with a subsystem of the plurality of subsystems 106. In an example, the communication may occur using a transport protocol such as RDMA over Converged Ethernet v1 (RoCEv1), RoCEv2, Internet Wide-area RDMA Protocol (iWARP) or Transmission Control Protocol/Internet Protocol (TCP/IP) for exchanging messages.

The target 102 may support a total number of I/O queue pairs (e.g., ranging between 128 and 512 I/O queue pairs) depending on its hardware resources and implementation. Accordingly, the target 102 may be capable of allocating the total number of I/O queue pairs among the hosts 104 that may be mapped to the target 102.

Figure 2A:
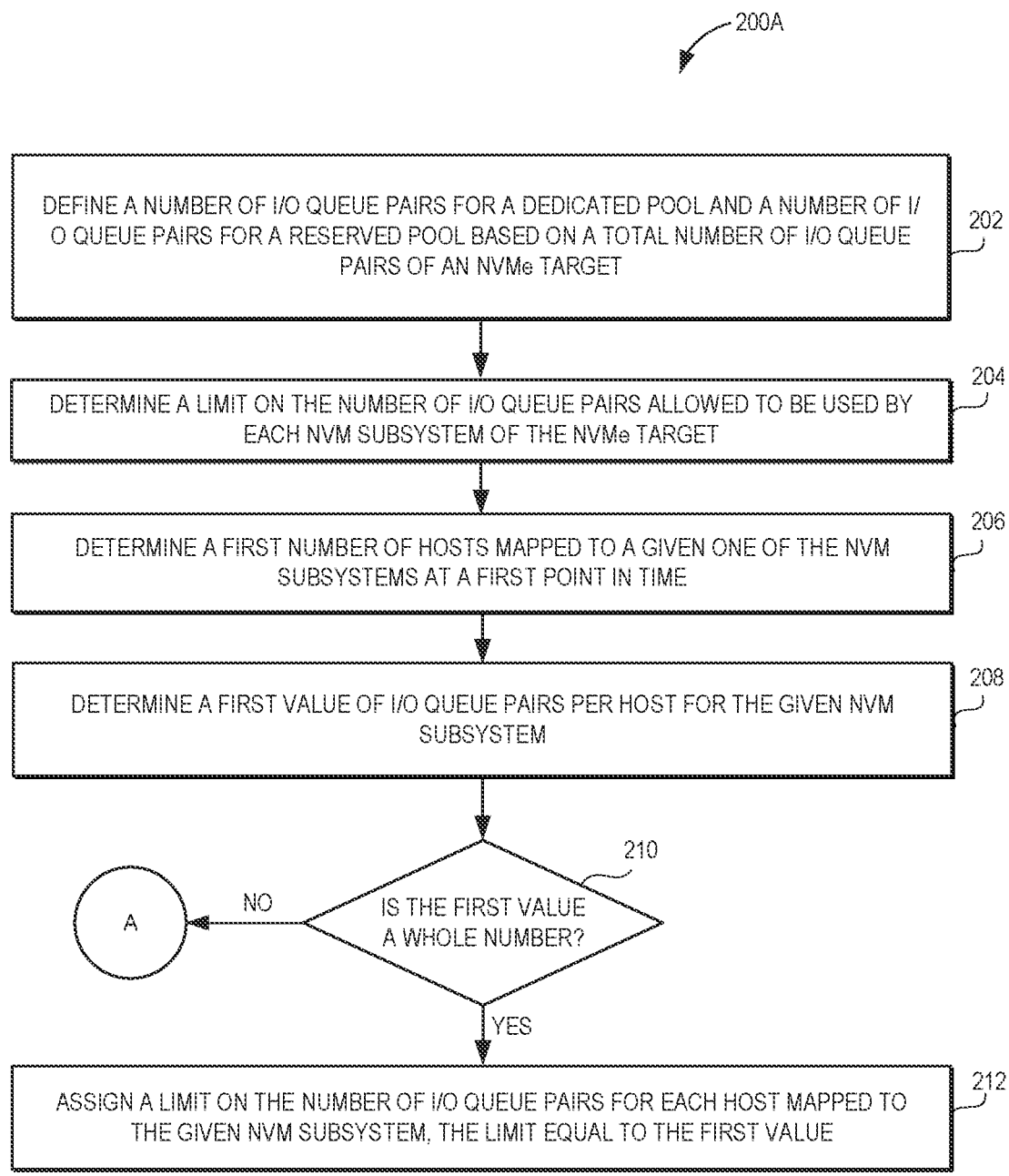
FIGS. 2A and 2B collectively depict a flowchart of a method for managing distribution of a number of I/O queue pairs of an NVMe target among a plurality of hosts connected to the NVMe target, in accordance with an example.
Figure 2B:
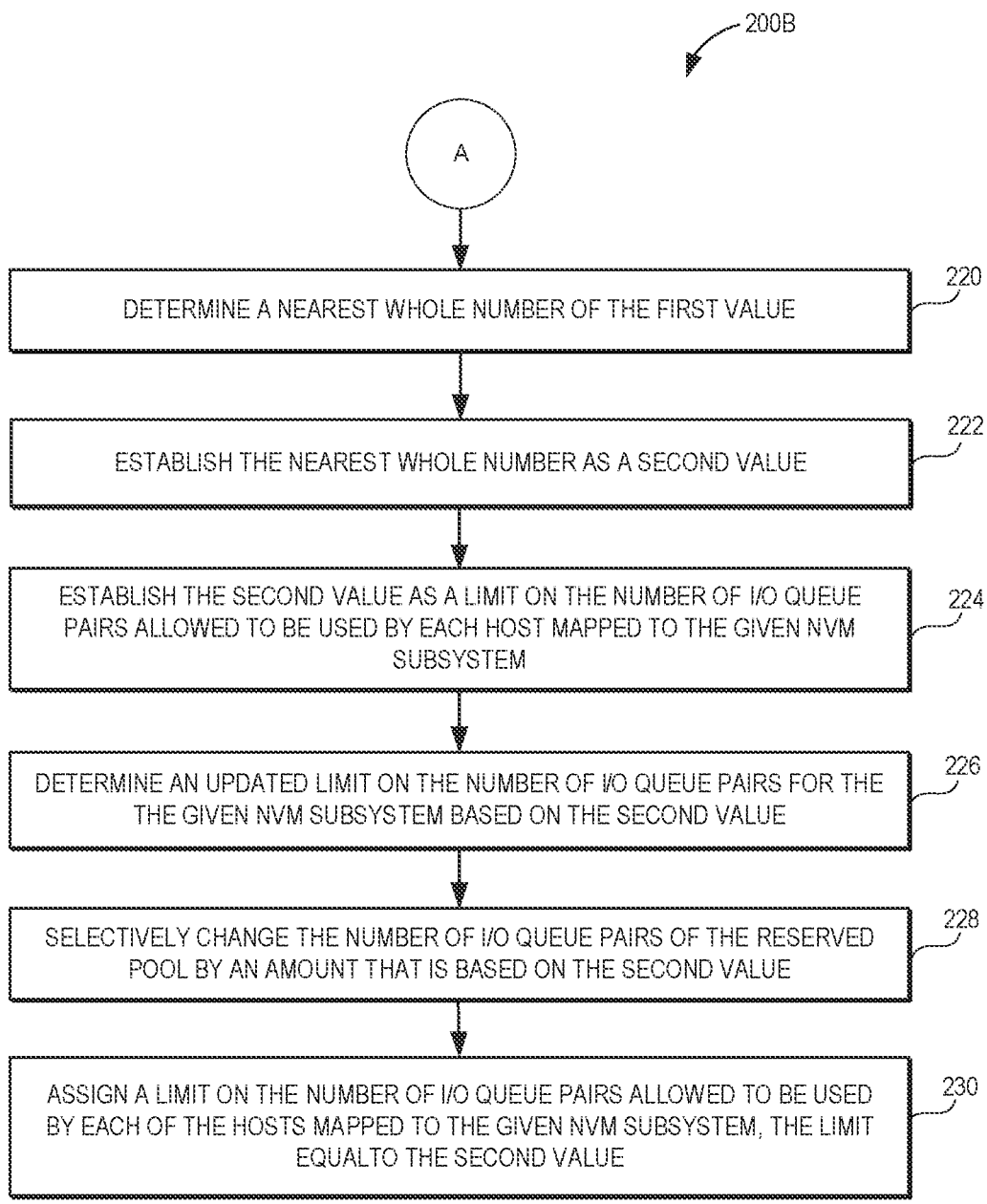

In accordance with the examples described herein, the target controller 110 may perform several functionalities for managing distribution of I/O queue pairs from the predetermined total number of I/O queue pairs in a balanced manner among the hosts 104 mapped to the subsystems 106 of the target 102. In an example, the functionalities performed by the target controller 110 may be performed by the processing resource 112 executing the instructions 116 stored in the machine-readable storage medium (e.g., a non-transitory machine-readable storage medium) 114. The functionalities performed by the target controller 110 for managing the distribution of the total number of I/O queue pairs of the target 102 among the hosts 104 mapped to the subsystems 106 of the target 102 are described herein with the help of the flowcharts of FIGS. 2A-2B and FIGS. 3A-3B. FIGS. 2A-2B collectively depict a flowchart of an example method for managing distribution of the predetermined total number of I/O queue pairs of the target 102 among the hosts 104 mapped to the subsystems 106 of the target 102 at a first point in time and FIGS. 3A-3B collectively depict a flowchart of another example method for managing distribution of the predetermined total number of I/O queue pairs of the target 102 among the hosts 104 mapped to the subsystems 106 of the target 102 at a second point in time. In particular, FIGS. 2A-2B collectively depict the flowchart of the example method for assigning a limit on the number of I/O queue pairs allowed to be used by each of the hosts 104 mapped to a given subsystem 106 of the target 102 at the first point in time and FIGS. 3A-3B collectively depict the flowchart of the other example method for assigning a limit on the number of I/O queue pairs allowed to be used by each of the hosts 104 mapped to the given subsystem 106 of the target 102 at the second point in time.

Although the example methods of FIGS. 2A-2B and FIGS. 3A-3B are described with reference to the target controller 110 of FIG. 1, other applications or devices suitable for the execution of the example methods of FIGS. 2A-2B and FIGS. 3A-3B may be utilized. Additionally, implementation of the methods is not limited to such examples. Further, although the example methods of FIGS. 2A-2B and FIGS. 3A-3B, individually, show a specific order of performing certain functionalities, the methods are not limited to such order. For example, the functionalities shown in succession in the flowcharts may be performed in a different order, may be executed concurrently, or with partial concurrence, or combinations thereof.

In FIG. 2A, a portion 200A of the flowchart includes a first set of method blocks 202-212 of the example method for assigning a limit on the number of I/O queue pairs allowed to be used by each of the hosts 104 mapped to the given subsystem 106 of the target 102 at the first point in time. In some examples, the first point in time may be representative of a first occurrence of assigning the I/O queue pair limit for each host 104 mapped to the given subsystem 106 at the first point in time. In an example, the method blocks 202-212 may be performed by the target controller 110, in particular, by the processing resource 112 of the target controller 110.

At block 202, the target controller 110 may define a number of I/O queue pairs for a dedicated pool and a number of I/O queue pairs for a reserved pool based on the total number of I/O queue pairs. The dedicated pool may refer to a portion of the total number of I/O queue pairs of the target 102 that is used to determine a limit on the number of I/O queue pairs allowed to be used by a subset of hosts mapped to each of the subsystems 106 of the target 102. The reserved pool may refer to another portion (e.g., the remaining portion) of the total number of I/O queue pairs that is used as a buffer to balance out the I/O queue pair limit for each host mapped to a given subsystem 106. In an example, the target controller 110 may distribute the total number of I/O queue pairs between the dedicated pool and the reserved pool based on instructions from an administrator (e.g., a user) and/or depending on the implementation of the target 102. In an example, the number of I/O queue pairs for the dedicated pool and the number of I/O queue pairs for the reserved pool may vary for example, from a ratio 1:5 to 5:1. For example, the dedicated pool may be defined to include 70 percent and the reserved pool may be defined to include 30 percent of the total number of I/O queue pairs. In an example, the sum of the number of I/O queue pairs of the dedicated pool and the number of I/O queue pairs of the reserved pool is equal to the total number of I/O queue pairs of the target 102. A number of I/O queue pairs defined for the dedicated pool may be referred to as dedicated I/O queue pairs and the number of I/O queue pairs defined for a reserved pool may be referred to as reserved I/O queue pairs.

At block 204, the target controller 110 may determine a limit on the number of I/O queue pairs allowed to be used by each of the subsystems 106 (which may be herein denoted by '$\alpha 1$') based on the dedicated I/O queue pairs and a total number of the subsystems 106. In some examples, the target controller 110 may equally distribute the dedicated I/O queue pairs among the subsystems 106 of the target 102 to determine the I/O queue pair limit for each subsystem 106. In one example, the target controller 110 may compute the I/O queue pair limit for each subsystem using an example relationship represented by equation (1).

$$\alpha 1 = \frac{\text{dedicated } I/O \text{ queue pairs}}{\text{Total number of subsystems}} \qquad \text{Equation (1)}$$

In other examples, the target controller 110 may distribute the dedicated I/O queue pairs among the subsystems 106 depending on their respective resources. In such instances, the target controller 110 may determine different limits on the numbers of I/O queue pairs allowed to be used by some of the subsystems 106.

At block 206, the target controller 110 may determine a first number (e.g., 'm') of hosts mapped to the given subsystem 106 at the first point in time. The target controller 110 may determine the first number (m) of hosts in the subset of hosts 104 mapped to the given subsystem 106 as defined by the mapping.

At block 208, the target controller 110 may determine a first value of the I/O queue pairs per host for the given subsystem 106 (which may be referred to herein as a first value and denoted by '$\beta 1$') based on the I/O queue pair limit for the given subsystem 106 ($\alpha 1$) and the first number (m) of hosts mapped to the given subsystem 106. In an example, the target controller 110 may compute the first value ($\beta 1$) by dividing the total I/O queue pair limit ($\alpha 1$) for the given subsystem 106 by the first number (m) of hosts mapped to the given subsystem 106 using an example relationship represented by equation (2).

$$\beta 1 = \frac{\alpha 1}{m} \qquad \text{Equation (2)}$$

The first value ($\beta 1$) for the given subsystem 106 may or may not be a whole number. At block 210, the target controller 110 may perform a check to determine whether the first value ($\beta 1$) is a whole number. At block 210, if it is determined that the first value ($\beta 1$) is a whole number ("YES" at block 210), the target controller 110, at block 212, may assign a limit on the number of I/O queue pairs allowed to be used by each host 104 (which may be referred to herein as an assigned I/O queue pair limit for a host and denoted by '$z1$') mapped to the given subsystem 106, where the assigned I/O queue pair limit for each host (z1) is equal to the first value ($\beta 1$).

Referring again to block 210, if it is determined that the first value ($\beta 1$) is not a whole number ("NO" at block 210), the method may proceed to a place holder 'A' leading to another portion of the flowchart depicted in FIG. 2B. FIG. 2B depicts a portion 200B of the flowchart including a second set of method blocks 220-230 of the example method. In an example, operations at blocks 220-230 may be performed by the target controller 110, in particular, by the processing resource 112 of the target controller 110.

In particular, at block 210 (see FIG. 2A) if it is determined that the first value ($\beta 1$) is not a whole number, the target controller 110, at block 220, may determine a nearest whole number to the first value ($\beta 1$). A nearest whole number to a given value (i.e., non-integer value) may refer to an integer nearest to the given value. The nearest whole number to the given value may be an integer greater or lesser than the given value. In some examples, a nearest whole number to the given value may be determined by rounding the given value to the nearest integer. For example, a nearest whole number to a value 2.8 is 3. In some examples, the target controller 110 may be configured to determine the nearest whole number to the first value ($\beta 1$) that is greater or lower than the first value ($\beta 1$). For illustration purposes, in the description hereinafter, the target controller 110 is described to determine a nearest whole number to the first value ($\beta 1$) that is greater than the first value ($\beta 1$) without limiting the scope of the present disclosure.

At block 222, the target controller 110 may establish the nearest whole number to the first value ($\beta 1$) as a second value of the I/O queue pairs per host for the given subsystem 106 (hereinafter referred to as "second value" and denoted by "$\beta'1$"). In an example, the second value ($\beta'1$) is a nearest whole number to the first value ($\beta 1$) when the first value ($\beta 1$) is not a whole number. Further, at block 224, the target controller 110 may establish the second value ($\beta'1$) as the I/O queue pair limit for each host 104 mapped to the given subsystem 106.

Furthermore, in some examples, at block 226, the target controller 110 may determine an updated limit on the number of I/O queue pairs allowed to be used for the given subsystem 106 (which may be referred to herein as an updated I/O queue pair limit for a subsystem and denoted by '$\alpha'1$') based on the second value ($\beta'1$) and the number of hosts (m) mapped to the given subsystem 106 at the first point in time. The target controller 110 may determine the updated I/O queue pair limit for the given subsystem 106 by determining a limit on the total number of I/O queue pairs allowed to be used by all the hosts 104 mapped to the given subsystem 106 based on the second value ($\beta'1$). In an example, the target controller 110 may compute the updated I/O queue pair limit ($\alpha1$) for the given subsystem 106 using an example relationship represented by equation (3).

$$\alpha'1 = \beta'1 \times m \qquad \text{Equation (3)}$$

The updated I/O queue pair limit ($\alpha'1$) for the given subsystem 106 may be different (e.g., greater or lesser) from the previously determined I/O queue pair limit ($\alpha1$) for the given subsystem 106. In such instances, the target controller 110 may leverage the reserved I/O queue pairs of the reserved pool to assign the I/O queue pair limit (z1) for each host 104 mapped to the given subsystem 106 in accordance with the updated I/O queue pair limit ($\alpha1$) for the given subsystem 106.

Moreover, at block 228, the target controller 110 may selectively change the number of I/O queue pairs of the reserved pool by an amount (i.e., a first amount) that is based on the second value ($\beta'1$). As used herein, the term "selectively change" or "selectively changing" may refer to an action to change the number of I/O queue pairs of the reserved pool when the updated I/O queue pair limit ($\alpha'1$) for the given subsystem 106 differs from the previously determined I/O queue pairs ($\alpha1$) for the given subsystem 106 and maintain (i.e., no change) the number of I/O queue pairs of the reserved pool when the updated I/O queue pair limit ($\alpha1$) for the given subsystem 106 does not differ from the previously determined I/O queue pair limit ($\alpha1$) for the given subsystem 106.

In some examples, the updated I/O queue pair limit ($\alpha1$) for the given subsystem 106 differs from the previously determined I/O queue pair limit ($\alpha1$) for the given subsystem 106. In these examples, the target controller 110 may change the number of I/O queue pairs of the reserved pool by the first amount that is a difference between the updated I/O queue pair limit ($\alpha'1$) for the given subsystem 106 and the previously determined I/O queue pair limit ($\alpha1$) for the given subsystem 106. For example, the target controller 110 may compute the first amount using an example relationship represented by equation (4).

$$\text{First amount} = \alpha'1 \sim \alpha1 \qquad \text{Equation (4)}$$

In other examples, the updated I/O queue pair limit ($\alpha'1$) for the given subsystem 106 does not differ from the previously determined I/O queue pair limit ($\alpha1$) for the given subsystem 106. In these examples, the target controller 110 may not change the number of I/O queue pairs of the reserved pool.

As described, the target controller 110 may change the number of I/O queue pairs of the reserved pool in order to compensate the difference between the updated I/O queue pair limit ($\alpha1$) for the given subsystem 106 and the previously determined I/O queue pair limit ($\alpha1$) for the given subsystem 106. In examples when the second value ($\beta'1$) is greater than the first value ($\beta1$) (i.e., ($\beta'1 > \beta1$) at the first point in time, the updated I/O queue pair limit ($\alpha'1$) for the given subsystem 106 is greater than the previously determined I/O queue pair limit ($\alpha1$) for the given subsystem 106 ($\alpha'1 > \alpha1$). In such examples, the target controller 110 may decrease the number of I/O queue pairs of the reserved pool by the first amount ($\alpha'1 \sim \alpha1$) to balance out the difference between the updated I/O queue pair limit ($\alpha'1$) for the given subsystem 106 and the previously determined I/O queue pair limit ($\alpha1$) for the given subsystem 106. The target controller 110 may decrease the number of I/O queue pairs of the reserved pool by allowing a number of I/O queue pairs equal to the first amount ($\alpha'1 \sim \alpha1$) from the reserved pool to increase the I/O queue pair limit for each host 104 mapped to the given subsystem 106 to the second value ($\beta'1$). In this manner, the target controller 110 may balance the I/O queue pair limit for each of the hosts 104 mapped to the given subsystem 106 by decreasing the number of I/O queue pairs in the reserved pool.

In examples when the second value ($\beta'1$) is lower than the first value ($\beta1$) (i.e., ($\beta'1 < \beta1$), the updated I/O queue pair limit ($\alpha'1$) for the given subsystem 106 is lower than the previously determined I/O queue pair limit ($\alpha1$) for the given subsystem 106 ($\alpha1 < \alpha1$). In such examples, the target controller 110 may increase the I/O queue pairs of the reserved pool by the first amount ($\alpha'1 \sim \alpha1$) to balance out the difference between the updated I/O queue pair limit ($\alpha'1$) for the given subsystem 106 and the previously determined I/O queue pair limit ($\alpha1$) for the given subsystem 106. The target controller 110 may increase the number of I/O queue pairs of the reserved pool by adding a number of I/O queue pair(s) equal to the first amount ($\alpha'1 \sim \alpha1$) to the reserved pool to decrease the I/O queue pair limit for each host 104 mapped to the given subsystem 106 to the second value ($\beta'1$). In this manner, the target controller 110 may balance the I/O queue pair limit on each of the hosts 104 mapped to the given subsystem 106 and thereby increase the number of I/O queue pairs in the reserved pool.

At block 230, the target controller 110 may assign a limit on the number of I/O queue pairs allowed to be used by each of the hosts 104 mapped to the given subsystem 106. In these instances, the assigned I/O queue pair limit (z1) for each host 104 mapped to the given subsystem 106 is equal to the second value ($\beta'1$) (that has been established as the I/O queue pair limit for each host 104 mapped to the given subsystem 106 at block 224).

In this manner, in examples when the first value ($\beta1$) is a whole number, each host 104 mapped to the given subsystem 106 may be assigned the I/O queue pair limit (z1) equal to the first value ($\beta1$). In example when the first value ($\beta1$) is not a whole number, each host 104 mapped to the given subsystem 106 may be assigned the I/O queue pair limit (z1) equal to the second value ($\beta'1$) by changing the number of I/O queue pairs of the reserved pool based on the second value ($\beta'1$).

In some examples, the target controller 110 may determine an aggregated limit on the number of I/O queue pairs allowed to be used by all the hosts 104 mapped to the given subsystem 106 (which may be referred to herein as an aggregated I/O queue pair limit for the hosts and denoted by '$\mu1$'), at the first point in time. In examples when the assigned I/O queue pair limit (z1) for each host 104 mapped to the given subsystem 106 is equal to the first value ($\beta1$) (at block 212 of FIG. 2A), the aggregated I/O queue pair limit ($\mu1$) for all the hosts 104 mapped to the given subsystem 106 is equal to the previously determined I/O queue pair limit ($\alpha1$) for the given subsystem 106. In examples when the updated I/O queue pair limit (α1) for the given subsystem 106 is determined based on the second value (β'1) (at block 226 of FIG. 2B) and/or the assigned I/O queue pair limit (z1) for each host 104 mapped to the given subsystem 106 is equal to the second value (β'1) (at block 230 of FIG. 2B), the aggregated I/O queue pair limit (μ1) for all the hosts 104 mapped to the given subsystem 106 is equal to the updated I/O queue pair limit (α'1) for the given subsystem 106.

In some examples, the method blocks in FIGS. 2A-2B may, individually, be executed, by the target controller 110, for the subsystems 106 of the target 102 to assign the respective I/O queue pair limits for the respective hosts 104 mapped to the respective subsystems 106 at the first point in time. In some examples, if a given host 104 mapped to the given subsystem 106 is also mapped to another subsystem 106 at the first point in time, the target controller 110 may determine the respective assigned I/O queue pair limits for the given host 104 with the respective subsystems 106. The target controller 110 may then determine a total limit on the number of I/O queue pairs assigned to the given host 104 (which may be referred to herein as a total assigned I/O queue pair limit and denoted by 'Z1') at the first point in time. The total assigned I/O queue pair limit (Z1) for the given host 104 is the sum of the respective assigned I/O queue pair limits (z1) for the given host 104 with the respective subsystems 106 at the first point in time. In an example, if the given host 104 is mapped to the subsystems 106-1 (e.g., a first subsystem S1) and 106-2 (e.g., a second subsystem S2), the total assigned I/O queue pair limit (Z1) for the given host 104 may be computed using an example relationship represented by equation (5).

$$Z1 = z1 \text{ for } S1 + z1 \text{ for } S2 \qquad \text{Equation (5)}$$

In some examples, the target controller 110 may maintain a first information including an I/O queue pair limit (α1) for each subsystem 106, a number of hosts (m) mapped to each subsystem 106, a first value (β1), a second value (β'1), an updated I/O queue pair limit (α1) for each subsystem 106, a first amount (a'1~α1), a change in the number of I/O queue pairs of the reserved pool (i.e., a change in reserved pool) and an assigned I/O queue pair limit (z1) for each host 104 mapped to each subsystem 106 of the target 102 at the first point in time. As used herein, the term "a change in the number" may represents a number. As an example, Table 1 shows the first information for the subsystem 106-1 (e.g., the first subsystem S1) and the subsystem 106-2 (e.g., the second subsystem S2) of the target 102 at the first point in time.

TABLE 1

Example first information at the first point in time

| Sub-system | α1 | m | β1 | β'1 | α'1 | α'1~α1 | Change in Reserved pool | z1 |
|---|---|---|---|---|---|---|---|---|
| S1 | 8 | 2 | 4 | — | — | — | — | 4 |
| S2 | 8 | 3 | 2.66 | 3 | 9 | 1 | −1 | 3 |

In Table 1, an I/O queue pair limit for each of the subsystem S1 and S2 is eight (i.e., α1=8). A number of hosts mapped to subsystem S1 is two (i.e., m=2). Accordingly, a first value for subsystem S1 is four (β1=8/2=4), which is a whole number. For subsystem S1, the assigned I/O queue pair limit (z1) for each host mapped to the subsystem S1 is equal to the first value (β1=4).

For subsystem S2, a number of hosts mapped to subsystem S2 is three (i.e., m=3). Accordingly, a first value for subsystem S2 is 2.66 (β1=8/3=2.66), which is not a whole number. Therefore, a second value established for subsystem S2 is three (β'1=3). An updated I/O queue pair limit for subsystem S2 is nine (α'1='1×m=9) based on the second value (β'1=3). As the updated I/O queue pair limit (α1) for subsystem S2 is greater than the I/O queue pair limit (α1) for subsystem S2, the number of I/O queue pairs of the reserved pool is reduced by the first amount (α1~α1=9−8=1). Accordingly, a change in reserved pool is one, which is shown as '−1' in Table 1. For subsystem S2, the assigned I/O queue pair limit (z1) for each host mapped to the subsystem S2 is equal to the second value (β'1=3).

In examples when a given host 104 mapped to the given subsystem 106 requests for a number of I/O queue pairs (e.g., 'x' number of I/O queue pairs) to use or to be granted to the given host 104 at the first point in time, the target controller 110 may determine the assigned I/O queue pair limit (z1) for the given host 104 from the maintained first information (e.g., Table 1). Based on the assigned I/O queue pair limit (z1) for the given host 104, the target controller 110 may grant a number of I/O queue pairs (which may be referred to herein as granted I/O queue pairs and denoted by 'y1') to the given host 104 based on the assigned I/O queue pair limit (z1) for the given host 104. In some examples, if the requested number of I/O queue pairs (x) is more than the assigned I/O queue pair limit (z1) for the given host 104 (i.e., x>z1), the target controller 110 may grant a number of I/O queue pairs equal to the assigned I/O queue pair limit (z1) to the given host with the given subsystem 106 (i.e., y1=z1). In some examples, if the requested number of I/O queue pairs (x) is less than the assigned I/O queue pair limit (z1) for the given host 104 (i.e., x<z1), the target controller 110 may grant a number of I/O queue pairs equal to the requested number of I/O queue pairs (x) to the given host 104 (i.e., y1=x).

In addition, when the given host 104 is mapped to two or more subsystems 106, the target controller 110 may, individually, grant respective numbers of I/O queue pairs (y1) to the given host 104 with the respective subsystems 106 in a similar manner as described above. In such examples, a total number of I/O queue pairs granted to the given host 104 (which may be referred to herein as total granted I/O queue pairs and denoted by 'Y1') may equal to the sum of the respective granted I/O queue pairs (y1) to the given host 104 with the respective subsystems 106. In an example, if the given host 104 is mapped to the subsystems 106-1 (e.g., the first subsystem S1) and 106-2 (e.g., the second subsystem S2), the total granted I/O queue pairs (Y1) to the given host 104 may be computed using an example relationship represented by equation (6).

$$Y1 = y1 \text{ for } S1 + y1 \text{ for } S2 \qquad \text{Equation (6)}$$

In some examples, the target controller 110 may maintain a second information including a total assigned I/O queue pair limit (Z1) and a total granted I/O queue pairs (Y1) for each of the hosts 104 mapped to the subsystem(s) 106 of the target 102, at the first point in time. For example, Table 2 shows such second information including a total assigned I/O queue pair limit (Z1) and a total granted I/O queue pairs (Y1) for each of the hosts 104 (e.g., $H_1, H_z, \ldots H_N$) mapped to the subsystem(s) 106 of the target 102 at the first point in time.

TABLE 2

Example second information at the first point in time

| Host | Z1 | Y1 |
|---|---|---|
| $H_1$ | 8 | 4 |
| $H_2$ | 16 | 12 |
| ... | ... | ... |
| $H_N$ | 4 | 4 |

Figure 3A:
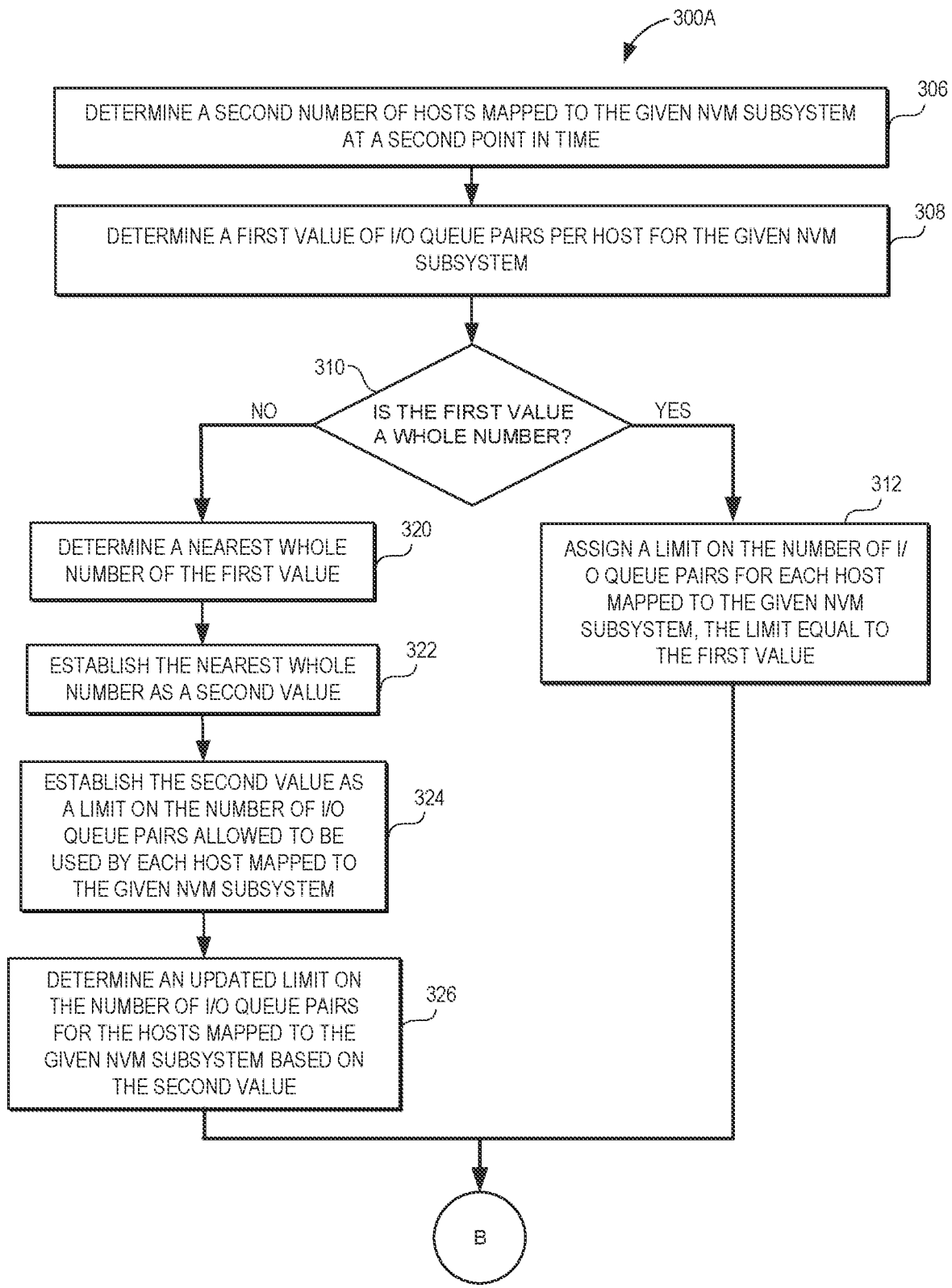
FIGS. 3A and 3B collectively depict a flowchart of a method for managing distribution of a number of I/O queue pairs of an NVMe target among a plurality of hosts connected to the NVMe target, in accordance with another example.

In some examples, the target controller 110 may determine whether to update the number of I/O queue pairs of the reserved pool based on a second number of hosts mapped to the given subsystem 106 at a second point in time. In FIG. 3A, a portion 300A of the flowchart includes a first set of method blocks 302-326 of the other example method for assigning a limit on the number of I/O queue pairs for each of the hosts 104 mapped to the given subsystem 106 of the target 102 at the second point in time. In an example, the second point in time may be later the first point in time. At the second point in time, one or more new hosts 104 may be mapped to the given subsystem 106 or one or more hosts 104 that has been mapped to the given subsystem 106 at the first point in time may be removed. In an example, operations at blocks 302-326 may be performed by the target controller 110, in particular, by the processing resource 112 of the target controller 110. The method blocks 306-326 may be performed after performing the method blocks 202-212 of FIG. 2A and method blocks 220-230 of FIG. 2B.

FIG. 3A includes certain method blocks that are similar to one or more method blocks described in FIG. 2A or FIG. 2B, details of which are not repeated herein for the sake of brevity. By way of example, the blocks 306, 308, 310 and 312 of FIG. 3A are respectively similar to blocks 206, 208, 210 and 212 of FIG. 2A and blocks 320, 322, 324 and 326 of FIG. 3A are respectively similar to blocks 220, 222, 224 and 226 of FIG. 2B.

At block 306, the target controller 110 may determine a second number (p) of hosts mapped to the given subsystem 106 at the second point in time. The second number (p) of hosts may be different from the first number (m) of hosts mapped to the given subsystem 106 at the first point in time. The second number (p) of hosts mapped to the given subsystem 106 at the second point in time may be greater (when one or more new hosts are mapped to the given subsystem 106) or lesser (when one or more hosts 104 are removed to access the given subsystem 106) than the first number (m) of hosts mapped to the given subsystem 106 at the first point in time. Based on the second number (p) of hosts 104, the target controller 110 may perform similar operations as described with reference to one or more method blocks of FIGS. 2A-2B to assign a limit on the number of I/O queue pairs allowed to be used by each of the hosts 104 mapped to the given subsystem 106 at the second point in time and determine whether to update the number of I/O queue pairs of the reserved pool.

For example, at block 308, the target controller 110 may determine a first value of I/O queue pairs per host for the given subsystem 106 (which may be denoted by 'β2' herein at the second point in time) based on the I/O queue pair limit (α1) for the given subsystem 106 and the second number of hosts (p) mapped to the given subsystem 106 at the second point in time. In an example, the target controller 110 may compute the first value (β1) by dividing the I/O queue pair limit (α1) for the given subsystem 106 by the second number of hosts (p) mapped to the given subsystem 106 using an example relationship represented by equation (7)

$$\beta 2 = \frac{\alpha 1}{p} \quad \text{Equation (7)}$$

Further, at block 310, the target controller 110 may perform a check to determine whether the first value (β2) is a whole number. If it is determined that the first value (β2) is a whole number ("YES" at block 310), the target controller 110, at block 312, may assign a limit on the number of I/O queue pairs allowed to be used by each host 104 mapped to the given subsystem 106 (which may be denoted herein by 'z2' at the second point in time). In these examples, the assigned I/O queue pair limit (z2) for each host 104 mapped to the given subsystem 106 may be equal to the first value (β2) at the second point in time.

Referring again to block 310, if it is determined that the first value (β2) is not a whole number ("NO" at block 310), the target controller 110, at block 320, may determine a nearest whole number to the first value (β2). At block 322, the target controller 110 may establish the nearest whole number to the first value (β2) as a second value (which may be denoted herein by 'β'2') at the second point in time. At block 324, the target controller 110 may establish the second value (β'2) as a limit on the number of I/O queue pairs allowed to be used by each host 104 mapped to the given subsystem 106 at the second point in time. At block 326, the target controller 110 may determine an updated I/O queue pair limit for the given subsystem 106 (which may be denoted herein by 'a'2' at the second point in time) based on the second value (β'2) and the number of hosts (p) mapped to the given subsystem 106 at the second point in time. In an example, the target controller 110 may compute the updated I/O queue pair limit (α'2) for the given subsystem 106 using an example relationship represented by equation (8).

$$\alpha'2 = \beta'2 \times p \quad \text{Equation (8)}$$

Figure 3B:
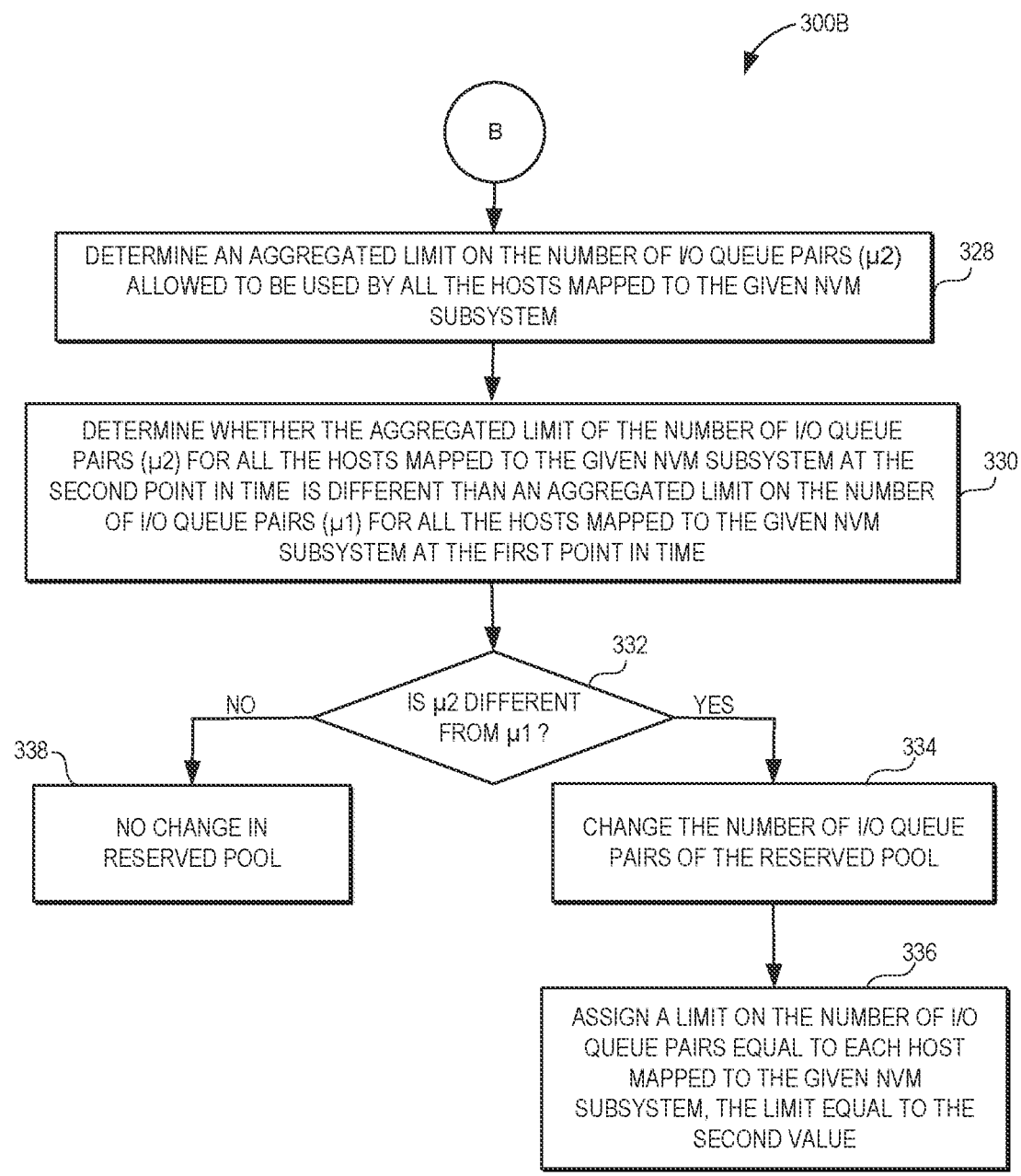

The method may now proceed to a place holder 'B' leading to another portion of the flowchart depicted in FIG. 3B. FIG. 3B depicts a portion 300B of the flowchart including a second set of method blocks 328-338 of the other example method at the second point in time. In an example, operations at blocks 328-338 may be performed by the target controller 110, in particular, by the processing resource 112 of the target controller 110.

At block 328, the target controller 110 may determine an aggregated limit on the number of I/O queue pairs (which may be denoted herein by 'μ2') allowed to be used by all the hosts 104 mapped to the given subsystem 106 at the second point in time. In examples when the target controller 110 assigns the I/O queue pair limit (z2) for each host 104 mapped to the given subsystem 106 equal to the first value (β2) (at block 314 of FIG. 3A), the aggregated I/O queue pair limit (μ2) for all the hosts 104 mapped to the given subsystem 106 is equal to the previously determined total I/O queue pair limit (α1) for the given subsystem 106 (i.e., μ2=α1). In examples when the target controller 110 determines the updated I/O queue pair limit (α'2) for the given subsystem 106 based on the second value (β'2) (at block 326 of FIG. 3A), the aggregated I/O queue pair limit (μ2) for all the hosts 104 mapped to the given subsystem 106 is equal to the updated I/O queue pair limit (α'2) for the given subsystem 106 (i.e., μ2=α'2).

At block 330, the target controller 110 may perform a check to determine whether the aggregated I/O queue pair limit (μ2) for all the hosts mapped to the given subsystem 106 at the second point in time is different from the aggregated I/O queue pair limit (µ1) for all the hosts mapped to the given subsystem 106 at the first point in time. In an example, the target controller 110 may compare the aggregated I/O queue pair limit (µ2) at the second point in time with the aggregated I/O queue pair limit (µ1) at the first point in time.

At block 332, if it is determined that the aggregated I/O queue pair limit (µ2) at the second point in time is different from the aggregated I/O queue pair limit (µ1) at the first point in time ("YES" at block 332), the target controller 110, at block 334, may change the number of I/O queue pairs of the reserved pool in order to balance out the difference between the aggregated I/O queue pair limit (µ2) for all the hosts mapped to the given subsystem 106 at the second point in time and the aggregated I/O queue pair limit (µ1) for all the hosts mapped to the given subsystem 106 at the first point in time. For example, if the aggregated I/O queue pair limit (µ2) at the second point in time is more than the aggregated I/O queue pair limit (µ1) at the first point in time, the target controller 110 may reduce the number of I/O queue pairs of the reserved pool by allowing a number of I/O queue pairs a second amount (µ2~µ1) to increase the I/O queue pair limit for each host 104 mapped to the given subsystem 106 to the second value (β'2). In some examples, the aggregated number of allowed I/O queue pairs (µ2) at the second point in time is less than aggregated number of allowed I/O queue pairs (µ1) at the first point in time, the target controller 110 may release a number of I/O queue pairs equal to the second amount (µ2~µ1) from one or more hosts 104 mapped to the given subsystem 106 to decrease the I/O queue pair limit for each host 104 mapped to the given subsystem 106 to the second value (β'2). In these instances, the target controller 110 may add or replenish the released number of I/O queue pairs to the number of I/O queue pairs of the reserved pool. The method may then proceed to block 336.

At block 336, the target controller 110 may assign a limit on the number of I/O queue pairs allowed to be used by each host 104 mapped to the given subsystem 106. In these examples, the assigned I/O queue pair limit (z2) for each host 104 mapped to the given subsystem 106 is equal to the second value (β'2).

At block 332, if it is determined that the aggregated I/O queue pair limit (µ2) for all the hosts 104 mapped to the given subsystem 106 at the second point in time is not different from the aggregated I/O queue pair limit (µ1) for all the hosts 104 mapped to the given subsystem 106 at the first point in time ("NO" at block 332), the target controller 110, at block 338, may not change the number of I/O queue pairs of the reserved pool. In such examples, each host 104 mapped to the given subsystem 106 may be allowed to use the number of I/O queue pairs equal to the first value (β2) as assigned to each host 104 at block 314 of FIG. 3A.

In some examples, the sets of method blocks in FIGS. 3A-3B may, individually, be executed, by the target controller 110, for the subsystems 106 present in the target 102 to assign the respective I/O queue pair limits for the respective hosts 104 mapped to the respective subsystems 106 at the second point in time. The target controller 110 may then determine a total assigned I/O queue pair limit (Z2) for the given host 104 at the second point in time. The total assigned I/O queue pair limit (Z2) for the given host 104 may be the sum of the respective assigned I/O queue pair limits (z2) for the given host 104 with the respective subsystems 106 at the second point in time. For example, if the given host 104 is mapped to the subsystems 106-1 (e.g., the first subsystem S1) and 106-2 (e.g., the second subsystem S2), the total assigned I/O queue pair limit (Z2) to the given host 104 may be computed using an example relationship represented by equation (9).

$$Z2 = z2 \text{ for } S1 + z2 \text{ for } S2 \qquad \text{Equation (9)}$$

The target controller 110 may maintain a first information at the second point in time similar to the first information (e.g., Table 1) at the first point in time. In an example, the target controller 110 may update the first information at the second point in time with an additional information of the second amount (µ2~µ1) in place of the first amount (α1~α1). The updated first information may include a total I/O queue pair limit (α1) for each subsystem 106, a number of hosts (p) mapped to each subsystem 106, a first value (µ2), a second value (µ2), an updated I/O queue pair limit (α'2) for each subsystem, an amount (i.e., a second amount (µ2~µ1), an assigned I/O queue pair limit (z2) for each host 104 mapped to each subsystem 106 and a change in the number of I/O queue pairs of the reserved pool at the second point in time. For example, Table 1 is updated as updated Table 1 that includes the updated first information at the second point in time for the subsystems S1 and S2 of the target 102 when a new host is mapped to each of the subsystems S1 and S2 as compared to that of the numbers of hosts mapped to each of the subsystems S1 and S2 at the first point in time.

Updated Table 1:
Example first information at the second point in time

| Subsystem | α2 | p | β2 | β'2 | α'2 | µ2~µ1 | Change in Reserved pool | z2 |
|---|---|---|---|---|---|---|---|---|
| S1 | 8 | 3 | 2.66 | 3 | 9 | 1 | −1 | 3 |
| S2 | 8 | 4 | 2 |   | 8 | 1 | +1 | 2 |

Referring to Table 1 and updated Table 1, when S1 is mapped to three hosts (p=3 in updated Table 1) at the second point in time as compared to two hosts (m=2 in Table 1) at the first point in time, the target controller 110 assigns a limit of three I/O queue pairs (z2=3 in updated Table 1) for each of the three hosts at the second point in time as compared to a limit of four I/O queue pairs (z1=4 in Table 1) assigned to each of the two hosts at the first point in time. In this case, as an aggregated I/O queue pair limit for three hosts (µ2) is nine (µ2=α'2=9 in accordance with updated Table 1) at the second point in time as compared to an aggregated I/O queue pair limit for two hosts (µ1) is eight (µ1α1=8 in accordance with Table 1) for S1 at the first point in time, one I/O queue pair from the reserved pool (change in reserved pool=−1) is reduced to assign one I/O queue pair (µ2 µ1=9−8=1) to the new host.

When S2 is mapped to four hosts (p=4 in updated Table 1) at the second point in time as compared to three hosts (m=3 in Table 1) at the first point in time, the target controller 110 assigns a limit of two I/O queue pairs (z2=2 in updated Table 1) to each of the four hosts at the second point in time as compared to a limit of three I/O queue pairs (z1=3 in Table 1) to each of the three hosts at the first point in time. In this case, as an aggregated I/O queue pair limit for four hosts is eight (i.e., µ2=a1=8 in accordance with updated Table 1) at the second point in time as compared to an aggregated I/O queue pair limit for three hosts is nine (µ1=α'1=9 in accordance with Table 1) at the first point in time, one I/O queue pair (µ2~µ1=9−8=1) is added to the reserved pool (change in reserved pool=+1).

In some examples, when a given host 104 is mapped to two or more subsystems 106, the target controller 110 may, individually, grant respective numbers of I/O queue pairs to the given host 104 with the respective subsystems 106 in a similar fashion as described above with respect to a given host 104 at the first point in time. In such examples, at the second point in time, the given host 104 may have a total number of granted I/O queue pairs (which may be denoted herein by 'Y2') equal to the sum of the respective numbers of granted I/O queue pairs (which may be denoted herein by 'y2') with the respective subsystems 106. For example, if the given host 104 is mapped to the subsystems 106-1 (e.g., the first subsystem S1) and 106-2 (e.g., the second subsystem S2) at the second point in time, the total granted I/O queue pairs (Y2) to the given host 104 may be computed using an example relationship represented by equation (10).

$$Y2 = y2 \text{ for } S1 + y2 \text{ for } S2 \qquad \text{Equation (10)}$$

In some examples, the target controller 110 may then update the second information (e.g., Table 2) at the second point in time. The updated second information at the second point in time may include a total assigned I/O queue pair limit (Z2) for each of the hosts 104 and a total number of granted I/O queue pairs (Y2) for each of the hosts 104 mapped to the subsystem(s) 106 of the target 102, at the second point in time. For example, Table 2 is updated as updated Table 2 to include the total assigned I/O queue pair limit (Z2) at the second point in time and the total number of granted I/O queue pairs (Y2) at the second point in time for each of the hosts ($H_1$, $H_2$, ... $H_N$) mapped to the subsystem(s) 106 of the target 102 at the second point in time.

Updated Table 2:
Example second information at the second point in time

| Host | Z2 | Y2 |
|---|---|---|
| $H_1$ | 6 | 6 |
| $H_2$ | 12 | 10 |
| ... | ... | ... |
| $H_N$ | 4 | 4 |

In some examples, the target controller 110 may dynamically update the first information (e.g., Table 1) and the second information (e.g., Table 2). As used herein, the term "dynamically update" may refer to updating the first information and the second information based on a change (e.g., on addition or removal) in the number of hosts mapped to the subsystem(s) 106 at a point in time.

Figure 4:
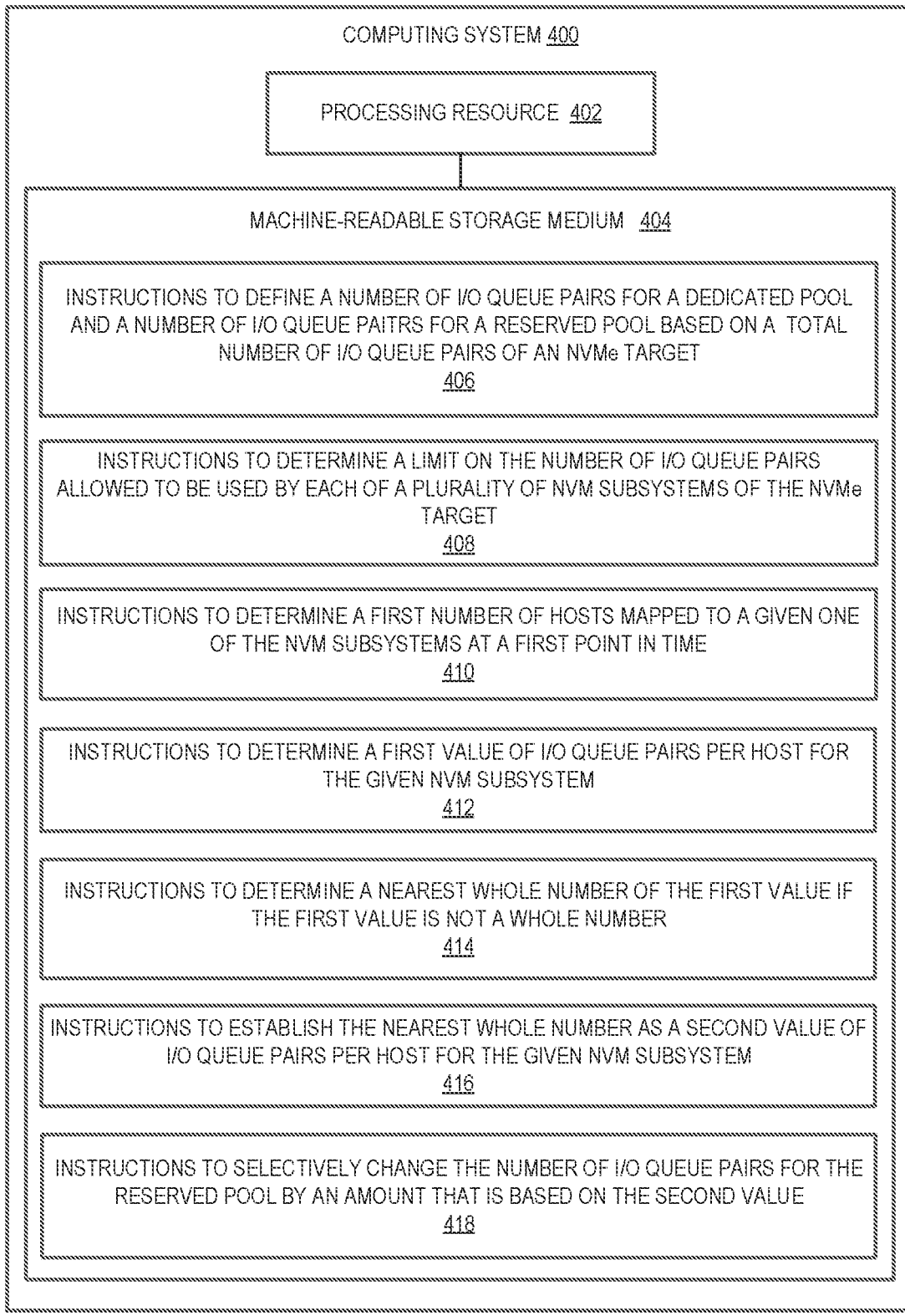
FIG. 4 is a block diagram of a computing system comprising a processing resource and a machine-readable storage medium encoded with example instructions to manage distribution of a number of I/O queue pairs of an NVMe target among a plurality of hosts connected to the NVMe target, in accordance with an example.

FIG. 4 is a block diagram of a computing system 400 including a processing resource 402 and a machine-readable storage medium 404 encoded with example instructions to manage the distribution of a number of I/O queue pairs of an NVMe target (e.g., the target 102 of FIG. 1) among a plurality of hosts connected to the NVMe target, in accordance with an example. The machine-readable storage medium 404 may be non-transitory and is alternatively referred to as a non-transitory machine-readable storage medium 404. As described in detail herein, the machine-readable storage medium 404 may be encoded with executable instructions 406, 408, 410, 412, 414, 416 and 418 (hereinafter collectively referred to as instructions 406-418) for performing one or more the method blocks of flow diagrams 200A and 200B of FIGS. 2A-2B. Although not shown, in some examples, the machine-readable storage medium 404 may be encoded with certain additional executable instructions to perform one or more of the method blocks of flow diagrams 300A and 300B of FIGS. 3A-3B, and/or any other operations performed by the target controller 110, without limiting the scope of the present disclosure.

In some examples, the machine-readable storage medium 404 may be accessed by the processing resource 402. In some examples, the computing system 400 may be included in (e.g., as part of) a target controller (e.g., the target controller 110 of FIG. 1). In some examples, the processing resource 402 may represent one example of the processing resource 112 of the target controller 110. Further, the machine-readable storage medium 404 may represent one example of the machine-readable storage medium 114 of the target controller 110. In some examples, the processing resource 402 may fetch, decode, and execute the instructions 406-418 stored in the machine-readable storage medium 404 to assign a number of I/O queue pairs to each host 104 connected to the target 102.

The instructions 406 when executed by the processing resource 402 may cause the processing resource 402 to define a number of I/O queue pairs for a dedicated pool and a number of I/O queue pairs for a reserved pool based on a total number of I/O queue pairs of the target 102. Further, the instructions 408 when executed by the processing resource 402 may cause the processing resource 402 to determine a limit on the number of I/O queue pairs allowed to be used by each of the subsystems ($\alpha 1$) based on the dedicated I/O queue pairs and a total number of the subsystems 106. The instructions 410 when executed by the processing resource 402 may cause the processing resource 402 to determine a first number (m) of hosts mapped to a given subsystem 106 at a first point in time. Further, the instructions 412 when executed by the processing resource 402 may cause the processing resource 402 to determine a first value ($\beta 1$) of the I/O queue pairs per host for the given subsystem 106 based on the I/O queue pair limit for the given subsystem 106 ($\alpha 1$) and the first number (m) of hosts mapped to the given subsystem 106. Furthermore, the instructions 414 when executed by the processing resource 402 may cause the processing resource 402 to determine a nearest whole number to the first value ($\beta 1$) if the first value ($\beta 1$) is not a whole number. Furthermore, the instructions 416 when executed by the processing resource 402 may cause the processing resource 402 to establish the nearest whole number to the first value ($\beta 1$) as a second value ($\beta' 1$). Moreover, the instructions 418 when executed by the processing resource 402 may cause the processing resource 402 to selectively change the number of I/O queue pairs of the reserved pool by an amount that is based on the second value ($\beta' 1$).

In examples described herein, functionalities described as being performed by "instructions" may be understood as functionalities that may be performed by those instructions when executed by a processing resource. In other examples, functionalities described in relation to instructions may be implemented by one or more modules, which may be any combination of hardware and programming to implement the functionalities of the module(s).

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products except combinations where at least some of such features are mutually exclusive.

The invention claimed is:

1. A method comprising:
in a network having a non-volatile memory (NVM) express (NVMe) target capable of allocating a total number of I/O queue pairs and using NVMe over fabrics (NVMe-oF), defining, by a target controller of the NVMe target, a number of I/O queue pairs for a dedicated pool and a number of I/O queue pairs for a reserved pool, based on the total number of I/O queue pairs of the NVMe target;
determining, by the target controller, a limit on the number of I/O queue pairs allowed to be used by each of a plurality of NVM subsystems of the NVMe target, based on the number of I/O queue pairs defined for the dedicated pool and a total number of NVM subsystems in the plurality of NVM subsystems of the NVMe target;
at a first point in time, determining, by the target controller, a first number of hosts mapped to a given one of the NVM subsystems;
determining, by the target controller, a first value of I/O queue pairs per host for the given NVM subsystem based on the limit on the number of I/O queue pairs allowed to be used by the given NVM subsystem and the number of hosts mapped to the given NVM subsystem at the first point in time;
determining, by the target controller, a nearest whole number to the first value if the first value is not a whole number;
establishing, by the target controller, the nearest whole number as a second value of I/O queue pairs per host for the given NVM subsystem; and
selectively changing, by the target controller, the number of I/O queue pairs for the reserved pool by an amount that is based on the second value.

2. The method of claim 1, further comprising assigning a limit on the number of I/O queue pairs allowed to be used by each of the hosts mapped to the given NVM subsystem, the limit equal to the second value.

3. The method of claim 2, further comprising:
in response to receiving a request, from a given host of the hosts mapped to the given NVM subsystem, for a number of I/O queue pairs to be granted to the given host, granting a number of I/O queue pairs to the given host based on the assigned limit on the number of I/O queue pairs for the given host.

4. The method of claim 1, further comprising determining an updated limit on the number of I/O queue pairs allowed to be used by the given NVM subsystem based on the second value and the number of hosts mapped to the given NVM subsystem at the first point in time.

5. The method of claim 4, wherein the amount is a difference between the updated limit on the number of I/O queue pairs allowed to be used by the given NVM subsystem and the limit on the number of I/O queue pairs allowed to be used by the given NVM subsystem.

6. The method of claim 1, wherein selectively changing the number of I/O queue pairs for the reserved pool comprises decreasing the number of I/O queue pairs for the reserved pool when the second value is greater than the first value.

7. The method of claim 1, wherein selectively changing the number of I/O queue pairs for the reserved pool comprises increasing the number of I/O queue pairs for the reserved pool when the second value is lower than the first value.

8. The method of claim 1, further comprising determining, by the target controller, whether to update the number of I/O queue pairs of the reserved pool based on determining that a second number of hosts are mapped to the given NVM subsystem at a second point in time.

9. A target controller of a non-volatile memory (NVM) express (NVMe) target capable of allocating a total number of I/O queue pairs, comprising:
at least one processing resource and a non-transitory machine-readable storage medium comprising instructions executable by the at least one processing resource to:
define a number of I/O queue pairs for a dedicated pool and a number of I/O queue pairs for a reserved pool, based on the total number of I/O queue pairs of the NVMe target;
determine a limit on the number of I/O queue pairs allowed to be used by each of a plurality of NVM subsystems of the NVMe target based on the number of I/O queue pairs defined for the dedicated pool and a total number of NVM subsystems in the plurality of NVM subsystems of the NVMe target;
at a first point in time, determine a first number of hosts mapped to a given one of the NVM subsystems;
determine a first value of I/O queue pairs per host for the given NVM subsystem based on the limit on the number of I/O queue pairs allowed to be used by the given NVM subsystem and the number of hosts mapped to the given NVM subsystem at the first point in time;
determine a nearest whole number to the first value if the first value is not a whole number;
establish the nearest whole number as a second value of I/O queue pairs per host for the given NVM subsystem; and
selectively change the number of I/O queue pairs for the reserved pool by an amount that is based on the second value.

10. The target controller of claim 9, wherein the instructions comprise instructions executable by the at least one processing resource to:
assign a limit on the number of I/O queue pairs allowed to be used by each of the hosts mapped to the given NVM subsystem, the limit equal to the second value.

11. The target controller of claim 10, wherein the instructions comprise instructions executable by the at least one processing resource to:
in response to receiving a request, from a given host of the hosts mapped to the given NVM subsystem, for a number of I/O queue pairs to be granted to the given host, grant a number of I/O queue pairs to the given host based on the assigned limit on the number of I/O queue pairs for the given host.

12. The target controller of claim 9, wherein the instructions comprise instructions executable by the at least one processing resource to:
determine an updated limit on the number of I/O queue pairs allowed to be used by the given NVM subsystem based on the second value and the number of hosts mapped to the given NVM subsystem at the first point in time.

13. The target controller of claim 12, wherein the amount is a difference between the updated limit on the number of I/O queue pairs allowed to be used by the given NVM subsystem and the limit on the number of I/O queue pairs allowed to be used by the given NVM subsystem.

14. The target controller of claim 9, wherein the instructions to selectively change the number of I/O queue pairs of the reserved pool comprises instructions to decrease the number of I/O queue pairs of the reserved pool when the second value is greater than the first value.

15. The target controller of claim 9, wherein the instructions to selectively change the number of I/O queue pairs of the reserved pool comprises instructions to increase the number of I/O queue pairs of the reserved pool when the second value is lower than the first value.

16. The target controller of claim 9, wherein the instructions comprise instructions executable by the at least one processing resource to:
determine whether to update the number of I/O queue pairs of the reserved pool based on determining that a second number of hosts are mapped to the given NVM subsystem at a second point in time.

17. A non-transitory machine-readable storage medium comprising instructions executable by at least one processing resource to:
define a number of I/O queue pairs for a dedicated pool and a number of I/O queue pairs for a reserved pool based on a total number of I/O queue pairs of a non-volatile memory (NVM) express (NVMe) target;
determine a limit on the number of I/O queue pairs allowed to be used by each of a plurality of NVM subsystems of the NVMe target based on a number of I/O queue pairs defined for the dedicated pool and a total number of NVM subsystems in the plurality of NVM subsystems of the NVMe target;
determine, at a first point in time, a first number of hosts mapped to a given one of the NVM subsystems;
determine a first value of I/O queue pairs per host for the given NVM subsystem based on the limit on the number of I/O queue pairs allowed to be used by the given NVM subsystem and the number of hosts mapped to the given NVM subsystem at the first point in time;
determine a nearest whole number to the first value the first value is not a whole number;
establish the nearest whole number as a second value of I/O queue pairs per host for the given NVM subsystem; and
selectively change the number of I/O queue pairs for the reserved pool by an amount that is based on the second value.

18. The non-transitory machine-readable storage medium of claim 17, wherein the instructions comprise instructions to assign a limit on the number of I/O queue pairs allowed to be used by each of the hosts mapped to the given NVM subsystem, the limit equal to the second value.

19. The non-transitory machine-readable storage medium of claim 17, wherein the instructions comprise instructions to determine whether to update the number of I/O queue pairs of the reserved pool based on determining that a second number of hosts are mapped to the given NVM subsystem at a second point in time.

20. The non-transitory machine-readable storage medium of claim 17, wherein the instructions to selectively change comprise instructions to:
decrease the number of I/O queue pairs of the reserved pool when the second value is greater than the first value; or
increase the number of I/O queue pairs of the reserved pool when the second value is lower than the first value.

* * * * *